United States Patent [19]

Grisaffe et al.

[11] 3,931,447

[45] Jan. 6, 1976

[54] FUSED SILICIDE COATINGS CONTAINING DISCRETE PARTICLES FOR PROTECTING NIOBIUM ALLOYS

[75] Inventors: Salvatore J. Grisaffe; Stanley R. Levine, both of Rocky River, Ohio

[73] Assignee: The United States of America as represented by the United States National Aeronautics and Space Administration, Washington, D.C.

[22] Filed: May 4, 1973

[21] Appl. No.: 357,312

[52] U.S. Cl. .............. 428/450; 29/195 A; 427/203; 427/204; 427/205; 427/270; 427/275; 427/287; 428/457; 428/469; 428/539
[51] Int. Cl.² ...................... B32B 9/06; B32B 15/04
[58] Field of Search .......... 117/9, 16, 26, 49, 135.1, 117/169 A; 428/450, 457, 469, 539; 427/203, 204, 205, 270, 275, 287; 29/195 A

[56] References Cited
UNITED STATES PATENTS

| | | | |
|---|---|---|---|
| 2,337,691 | 12/1943 | Stettinius | 117/16 |
| 2,690,401 | 9/1954 | Gutzeit et al. | 117/47 A |
| 3,192,065 | 6/1965 | Page et al. | 117/135.1 X |
| 3,442,720 | 5/1969 | Bradley et al. | 117/21 X |
| 3,502,493 | 3/1970 | Forestek | 117/49 X |
| 3,503,791 | 3/1970 | Armand et al. | 117/135.1 |
| 3,734,769 | 5/1973 | Hirschfeld | 117/93.3 X |
| 3,759,727 | 9/1973 | Dietz et al. | 117/125 X |
| 3,761,372 | 9/1973 | Sastri | 117/93.3 |
| 3,765,953 | 10/1973 | Chevillon et al. | 117/135.1 X |
| 3,770,487 | 11/1973 | Gibson et al. | 117/135.1 X |
| 3,775,164 | 11/1973 | Smith et al. | 117/169 A X |
| 3,801,363 | 4/1974 | Buck | 117/169 A X |

FOREIGN PATENTS OR APPLICATIONS

| | | | |
|---|---|---|---|
| 1,496,660 | 2/1970 | Germany | 117/135.1 X |

*Primary Examiner*—William D. Martin
*Assistant Examiner*—Shriue P. Beck
*Attorney, Agent, or Firm*—N. T. Musial; G. E. Shook; John R. Manning

[57] ABSTRACT

Fused silicide coatings for protecting niobium alloy substrates are modified by providing dispersed nucleation sites in the form of discrete particles in the coating. The discrete particles have a thermal expansion coefficient lower than that of the fused silicide material. This alters the microstructure and reduces the thermal expansion coefficient of the coating so as to minimize the number of tensile cracks.

8 Claims, No Drawings

ID COATINGS CONTAINING
DISCRETE PARTICLES FOR PROTECTING
NIOBIUM ALLOYS

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

This invention is concerned with improving the protective ability of a coating having a higher thermal expansion coefficient than the metal it covers. The invention is particularly directed to protecting space shuttle reentry thermal protection systems, aircraft gas turbine engine components, and other applications where coatings must provide environmental protection for refractory metals. Superalloys can also be protected in this manner.

Conventional slurry silicide coatings have been modified to change the composition of the external metal di-silicide or the sub-silicide layers which form between the di-silicide and the refractory metal to be protected. Such modifications have, in essence, changed the oxides which form upon silicide coating oxidation. Extra oxides form in addition to silicon dioxide which is the primary protective oxide. These secondary oxides are readily formed at intermediate temperatures thereby enabling the silicides to resist catastrophic intermediate temperature oxidation, commonly called silicide pest. They also aid in filling the cracks formed in most silicide coatings and thus block direct exposure of the crack tips to air.

Cracks are formed in silicide coatings because of the large thermal expansion mismatch between metal silicides and the refractory metals. More particularly, the thermal expansion coefficient of the metal silicides is generally greater than that of refractory metals. Since silicide coatings generally have columnar grain structures oriented perpendicular to the substrate, the crack formations at the grain boundaries produce short paths between the oxidizing environment and the refractory metal substrate. Such cracks are potential oxidation failure sites.

SUMMARY OF THE INVENTION

According to the present invention silicide coatings on refractory metals have been modified to improve their resistance to cracking while further modifying other physical properties that affect their high temperature performance. Discrete particles or fibers are incorporated in the coating as inclusions by imbedding the particles in the substrate surface. If the particles are active, they will react upon slurry coatings to form silicide grains perpendicular to their exposed surfaces thereby randomizing the grain structure. If the particles are nonreactive, the growth of silicide grains is restricted to nucleation at only exposed substrate sites. This results in lateral grain growth.

In an alternate embodiment particles and fibers may be contained in the slurry. Certain of these particles react with the slurry and nucleate silicide grains in all directions. Others partially react and provide alternate surfaces for nucleation and growth. Still others block columnar growth of silicide grains from the substrate and force randomization.

OBJECTS OF THE INVENTION

It is, therefore, an object of the present invention to provide improved coatings having greater resistance to cracking.

Another object of the invention is to provide a refractory metal with an oxidation protective coating.

A further object of the invention is to modify the physical properties of coatings by providing dispersed nucleation sites at the substrate surface or in the coating by introducing an additional phase which has a lower thermal expansion coefficient than that of the coating.

Still another object of the invention is to randomize the microstructures of silicide coatings utilizing particles and fibers.

These and other objects of the invention will be apparent from the specification which follows.

DESCRIPTION OF PREFERRED EMBODIMENT

Silicides generally have larger thermal expansion coefficients than their parent metals. Niobium alloys have thermal expansion coefficients in the range of 7 to $8 \times 10^{-6}$ cm/cm°C whereas a thermal expansion coefficient of $NbSi_2$ is from about 7.3 to $11.7 \times 10^{-6}$ cm/cm°C. This difference in thermal expansion coefficients forms the source of tensile coating cracks. Tungsten powders were utilized as a modifier because, in addition to providing dispersed nucleation sites for the disruption of the columnar structure, the disilicide of tungsten with a thermal expansion coefficient of about $7.9 \times 10^{-6}$ cm/cm — °C forms an effective additive for reducing the thermal expansion coefficient of the coating. Also solid solutions of $WSi_2$ and $NbSi_2$ have smaller molar volumes than $NbSi_2$.

$Al_2O_3$ and $ZrO_2$. CaO were utilized as modifiers because of their high thermodynamic stability, dispersed nucleation site capabilities, and favorable thermal expansion effects. By way of example $Al_2O_3$ has a linear thermal expansion coefficient of about $8 \times 10^{-6}$ cm/cm — °C and the addition of 25% $Al_2O_3$ to $MoSi_2$ produces a composite with a thermal expansion coefficient of 7.3 times $10^{-6}$ compared with $8.8 \times 10^{-6}$ for $MoSi_2$. The addition of $Al_2O_3$ will produce similar results with $NbSi_2$.

Partially stabilized zirconia transforms from a mixture of cubic and monoclinic phases to a single tetragonal phase at about 1000°C. On heating, the coefficient of thermal expansion is about $7 \times 10^{-6}$ cm/cm — °C until the transformation temperature. At this point the coefficient becomes negative until the transformation is completed. Then, approximately the same rate of expansion is resumed. On cooling, the process is reversed forming a hysteresis loop. Based on a rule of mixtures, this behavior lowers the net thermal expansion coefficient of the composite coating, especially in the intermediate temperature range, thereby reducing the number of tensile cracks and thus tensile oxidation paths.

Refractory metal substrates were coated in accordance with the present invention. Each substrate was made of an alloy known commercially as FS–85 having a nominal composition of 28% Ta, 10% W, 1% Zr and the rest niobium. The niobium alloy was in the form of thin gage sheets in the 100% recrystallized condition having a thickness of approximately 0.030 cm or 12 mils. Such an alloy with this thickness is of interest for reentry vehicle heat shield applications.

Each substrate was coated with a fused slurry silicide coating having a nominal composition of 20% Cr, 20% Fe, and the rest silicon. Powders of -325 mesh of both silicon and chromium as well as 0.5 micron iron powders of greater than 99% purity were used to form the basic coating. A commercial coating of this type has been considered for the protection of heat shields.

Alloy surface modifiers were applied to the substrate. These modifiers were 4.5 micron tungsten powder and −325 mesh oxide powders of $Al_2O_3$, as well as $ZrO_2$ - 5 wt% CaO. The tungsten was greater than the 99.5 percent pure, and the oxide powders were greater than 98% pure. The modifiers were applied to the substrate by roll bonding, flame spraying, isostatic pressing, and slurry spraying.

The various substrate samples coated in accordance with the invention are shown in Table I. Each sample was 3.8 × 1.9 × 0.030 cm thick. Each sample was sheared with the long dimension parallel to the sheet rolling direction. The samples were jar milled in an alumina slurry to round off edges and corners. Certain of the samples were further prepared by electron beam melting a bead along the external edges. The bead diameter was approximately 2.3 times the sheet thickness. All of the samples were grit blasted with $Al_2O_3$, rinsed in water, measured, degreased, rinsed in distilled water and weighed to the nearest 0.1 mg.

The surfaces were modified by the four different methods previously discussed. The first of these was by a slurry sprayed modifier application using a nitrocellulose lacquer binder. The second procedure utilized roll bonding following the slurry spray application. The third method relied on isostatic pressing at about 20 ksi after slurry spraying and wrapping in Mylar. The last process utilized flame spraying with an oxyacetylene torch.

After the surface modification, the samples were re-weighed and measured. The specimens were then oversprayed with the Si-20Cr-20Fe slurry, re-weighed, and measured again. The green coatings were fused and annealed at 1420° C for 1 hour at a pressure below $2×10^{-4}$ torr once initial outgassing of the binder subsided. The samples were again weighed and measured after the firing cycle. This weight is shown in Table I.

Slow-cycle ambient pressure oxidation tests were conducted in a vertical mullite tube furnace controlled to ±10° C. The samples were exposed to temperatures above 1320° C for about 28 minutes of each 1 hour cycle and to a maximum temperature at 1370° C for about 10 minutes. The minimum temperature in each cycle was about 100° C. The samples were visually examined every few cycles and weighed once per day. The appearance of the first $Nb_2O_5$ pimple was considered the time to local coating breakdown and the sample was removed from the test. These life cycles are shown on Table I.

TABLE I

COATING DEPOSITION AND EVALUATION DATA

| Coating | Average total fired coating weight mg/cm² | As coated crack Frequency, cracks/mm | Slow cycle test life cycles | Average weight parity life, cycles mg/cm² |
| --- | --- | --- | --- | --- |
| Si-20Cr-20Fe | 22.2±1.9 | 16 | 34(20 to 43) | 1.5 |
| Si-20Cr-20Fe | 21.7±0.9 | — | 37,37 | 1.7 |
| Roll bond W[a] | b30.5±1.0 | 20 | 19,48 | 1.1 |
| Roll bond $Al_2O_3$ | b22.4±0.7 | 26 | 6,43 | 1.1 |
| Roll bond $ZrO_2$.CaO | b23.5±0.7 | 15 | 39,45 | 1.8 |
| Flame Spray W | 36.8±2.5 | 14 | 24,34 | 0.8 |
| Flame spray $Al_2O_3$ | 21.3±2.5 | 28 | 42,46 | 2.1 |
| Flame spray $ZrO_2$.CaO | 24.2±0.7 | 9 | 47,49 | 2.0 |
| Isostatic press W | 32.0±1.3 | 15 | 44,57 | 1.6 |
| Isostatic press $Al_2O_3$ | 23.3±0.8 | 22 | 15,30 | 1.0 |
| Isostatic press $ZrO_2$.CaO | 24.2±0.8 | 18 | 28,48 | 1.6 |
| Slurry spray W | 30.2±1.7 | 17 | 12,21 | 0.6 |
| Slurry spray $Al_2O_3$ | 23.5±0.3 | 20 | 27,47 | 1.6 |
| Slurry spray $ZrO_2$.CaO | 24.6±0.6 | 13 | 15,54 | 1.4 |
| Si-20Cr-20Fe; Edge beaded 0.033 cm FS-85 | 20.8±0.4 | 18 | 37,45 | 2.0 |

Representative samples of each coating were examined by metallography in the as-coated condition. Electron microprobe raster photomicrography was used to determine surface modifier distributions in the as-fuse coatings. Coating cracks were counted on 100× cross sectional micrographs in the as-coated condition. A crack was defined as a fissure extending from the diffusion zone to the coating surface for counting purposes. This information is also shown on Table I.

The weight parity life is also included in Table I to facilitate a comparison of systems with different coating weights. The weight parity life is defined as coating life in cycles divided by coating weight in mg/cm². The flame sprayed $ZrO_2$.CaO modification reduced the number of coating cracks and gave extended life. The flame sprayed alumina modifications refined the coating microstructure, reduced the columnar structure, and gave extended life.

DESCRIPTION OF ALTERNATE EMBODIMENTS

The preferred embodiment embedded the modifier in the surface of the substrate. The particles can be contained directly in the slurry, and these particles may be in the form of fibers.

Active materials, such as tungsten, molybdenum, columbium, tantalum, etc., or inert oxide fibers and particle additives, such as stabilized $ZrO_2$, $HfO_2$ as well as fused silica, might be utilized. These additions serve to alter coating microstructure, disrupt columnar structure of the coating, and reduce tensile coating cracks by reducing the net thermal expansion coefficient of the coating through a "rule of mixtures" effect. For example, a coating of Si-20 wt% Cr - 20 wt% Fe - 10 wt% $HfO_2$ reduced coating frequency from 16 to 13 cracks per mm and gave coating lives of 46 and 42 cycles in a 1-hour slow-cycle exposure test to 1370° C described previously. The coating weight was 19.3 mg/cm². Coating life on a weight parity basis was 2.3 cycles/mg/cm².

It is further contemplated that high emittance oxides and intermetallics, such as $Cr_2O_3$, NiO, and SiC could be added near the surface of the coating. The presence of high emittance particles near the coating surface will increase the emittance of the coating in proportion to the amount present. This high emittance lowers the effective temperature of the coating. Inasmuch as coating life is closely related to the exposure temperature, such a temperature decrease can significantly extend coating life. These compounds have emittance values ranging from 0.8 to 0.9 and greater. $Cr_2O_3$ is almost insoluble in the $SiO_2$ surface oxide and SiC as well as $SiO_2$ are known through long industrial practice to be compatible.

What is claimed is:

1. A niobium alloy having an oxidation protective coating consisting essentially of
    a fused silicide material with a higher thermal expansion coefficient than said niobium alloy, and
    fibers selected from the group consisting of tungsten and molybdenum in said silicide material to modify the physical properties of said coating by providing dispersed nucleation sites therein, said fibers having a thermal expansion coefficient lower than that of said fused silicide material whereby said coating has a thermal expansion coefficient between that of said fibers and said fused silicide material.

2. An article of manufacture as claimed in claim 1 wherein the coating material is formed from a fusable slurry and the discrete particles are mixed thoroughly therethrough.

3. A niobium alloy having an oxidation protective coating consisting essentially of
    a fused silicide material with a higher thermal expansion coefficient than said niobium alloy, and
    discrete particles comprising oxide fibers in said silicide material to modify the physical properties of said coating by providing dispersed nucleation sites therein, said discrete particles having a thermal expansion coefficient lower than that of said fuse silicide material whereby said coating has a thermal expansion coefficient between that of said discrete particles and said fused silicide material.

4. An article of manufacture as claimed in claim 3 wherein the discrete particles are non-reactive oxide.

5. An article of manufacture as claimed in claim 4 wherein the oxides are selected from the group consisting of $SiO2$, $Al_2O_3$, $HfO_2$, and stabilized $ZrO_2$.

6. An article of manufacture as claimed in claim 3 wherein the discrete particles have high emittance and are near the coating surface thereby increasing the emittance of the coatings whereby the effective temperature of the coating is lowered.

7. An article of manufacture as claimed in claim 6 wherein the high emittance particles are selected from the group consisting of $Cr_2O_3$, and NiO.

8. A method of modifying a fused silicide coating for protecting a surface of a niobium alloy having a lower thermal expansion coefficient than that of the fused silicide coating material whereby said fused silicide coating material is prone to crack upon cooling from elevated temperatures, said method comprising the steps of
    distributing a plurality of discrete particles of active metals selected from the group consisting of molybdenum, tungsten, columbium and tantalum in said coating material on the surface of said niobium alloy, and
    heating the coating material with said particles therein whereby said coating material is fused with the microstructure thereof altered and the thermal expansion coefficient reduced thereby minimizing the number of tensile cracks.

* * * * *